United States Patent
Brun

[15] 3,652,926

[45] Mar. 28, 1972

[54] OPTICAL PUMPING MAGNETOMETERS

[72] Inventor: Henri Brun, Paris, France

[73] Assignee: Thomson-CSF

[22] Filed: Feb. 25, 1970

[21] Appl. No.: 13,970

[30] Foreign Application Priority Data

Mar. 6, 1969 France.................................69/06240

[52] U.S. Cl. .........................................324/0.5 R
[51] Int. Cl........................................G01r 33/08
[58] Field of Search...................324/0.5; 331/3, 94; 330/4.3

[56] References Cited

UNITED STATES PATENTS 3,252,081  5/1966  Ruddock ..............................324/0.5

3,513,383  5/1970  Hartline................................324/0.5

Primary Examiner—Michael J. Lynch
Attorney—Cushman, Darby and Cushman

[57] ABSTRACT

The invention relates to optical pumping magnetometers, wherein an alkali vapor filling an absorption cell is optically pumped by means of a pumping source which provides light having two spectrum lines building up a doublet. The magnetometer according to the invention uses a cell whose walls are internally lined with a layer preserving the alignment of the alkali atoms. Improved detection of the R.F. lines is carried out with a birefringent plate converting said two spectrum lines radiations supplied by said cell with the same circular polarization into radiations rectilinearly polarized in mutually perpendicular directions.

5 Claims, 3 Drawing Figures

OPTICAL PUMPING MAGNETOMETERS

The present invention relates to optical pumping devices for measuring the intensity of a magnetic field. It relates more particularly to alkali vapor magnetometers using an absorption cell whose walls are internally lined with an appropriate coating; this coating enables the alkali atoms which are aligned by the action of the pumping light, to retain their alignment when they collide with the walls of the cells. In this kind of magnetometers, the optical pumping is effected by a light source emitting two spectrum lines $D_1$ and $D_2$ which are circularly polarized in the same direction by means of a rectilinear polarizer and a birefringent quarter wave plate. The two lines $D_1$ and $D_2$ are additive in their effect, as far as the optical pumping is concerned, but the variation in luminous intensity of the radiation $D_1$ and the radiation $D_2$ emerging from the absorption cell, have counteracting effects on the optical detection of the radiofrequency transitions. To insure good optical detection sensitivity, it is therefore necessary to provide between the absorption cell and the photoelectric transducer, an interference filter which transmits one of the lines unattenuated and absorbs the other line. Since the wavelengths of the two spectrum lines are very close together, the filtering of one line is a very delicate operation and optical detection is made less efficient as a consequence.

It is an object of this invention to avoid this drawback.

According to the invention, there is provided an optical pumping magnetometer comprising an absorption cell filled with an alkali vapor, a light source for emitting toward said cell a beam of light containing two lines $D_1$ and $D_2$ of the emission spectrum of said vapor, means positioned between said source and said cell for circularly polarizing in the same direction the luminous energies respectively corresponding to said lines $D_1$ and $D_2$, a photoelectric transducer positioned for receiving the light emerging from said cell and further polarizing means positioned on the path of said emerging light for selectively transmitting one of said lines $D_1$ and $D_2$ toward said transducer, said cell having walls internally lined with a layer preserving the alignment of the alkali atoms.

For a better understanding of the invention and to show how the same may be carried into effect reference will be made to the drawing accompanying the ensuing description and in which:

FIG. 1 schematically illustrates the arrangement of the optical elements of an optically pumped magnetometer of known kind.

Figure 1:
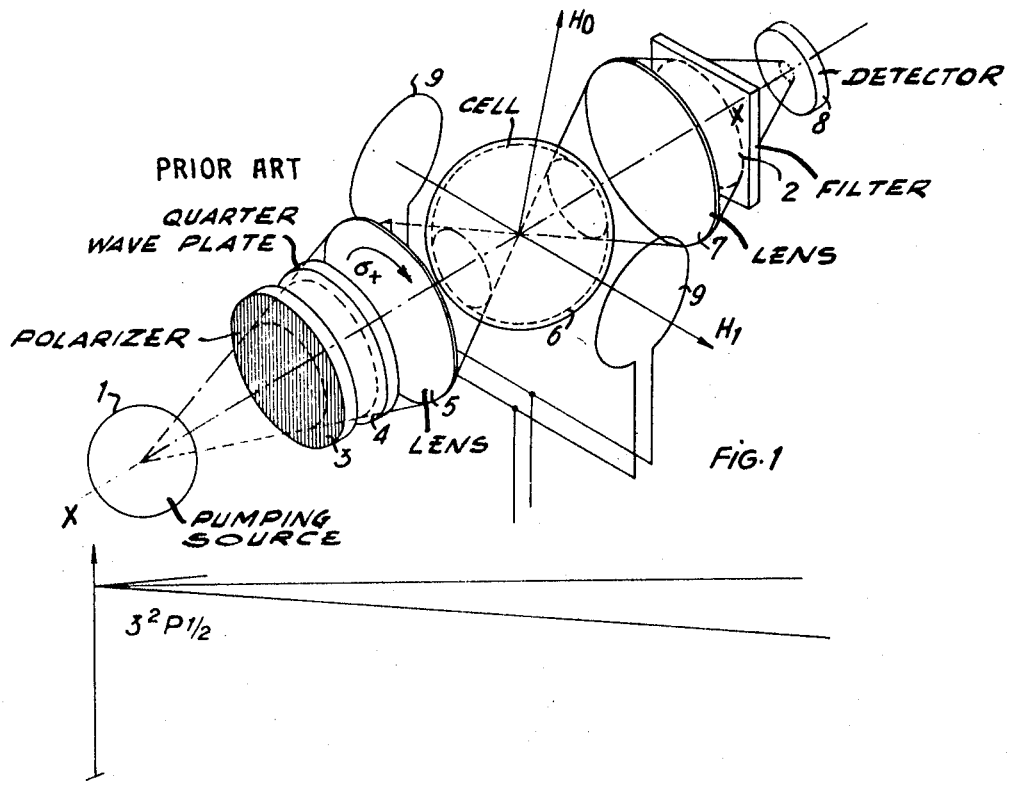

In FIG. 1, the optical elements of a magnetometer of known kind can be seen. Along an optical axis XX, there is disposed an absorption cell 6 containing an alkali element in the vapor state; the alkali element is subjected to the action of the magnetic field H being measured and to that of an alternating field $H_1$ produced by inductors 9. The alkali atoms contained in the cell 6 are optically aligned by means of a pumping light source 1 which emits a light beam containing two very closely spaced spectrum lines $D_1$ and $D_2$. The beam passes through a rectilinear polarizer 3 and a birefringent plate of the quarter wave kind 4, so that on emerging from the plate 4, the two spectrum lines $D_1$ and $D_2$ are circularly polarized in the $\sigma +$ direction. Lenses 5 and 7 are located at either side of the cell 6 for respectively receiving the light beam issuing from the source 1 and transmitting it to a photoelectric transducer 8. An electrical device (not shown) produces in the inductors 9 an alternating current of frequency $f$ by means of a variable frequency generator, whose frequency $f$ is a function of the voltage supplied by the transducer 8. The function of this device is to bring the frequency $f$ into coincidence with the center frequency $f_o$ of one of the radio frequency lines of the alkali vapor contained in the cell 6. An interference filter 2 is inserted between the transducer 8 and the lens 7 in order to absorb one of the spectrum lines emitted by the source 1. The optical alignment of the alkali atoms is promoted by the provision of an appropriate coating on the internal walls of the cell 6, this coating prevents any misalignment of the atoms as a consequence of collision with the walls.

Figure 2:
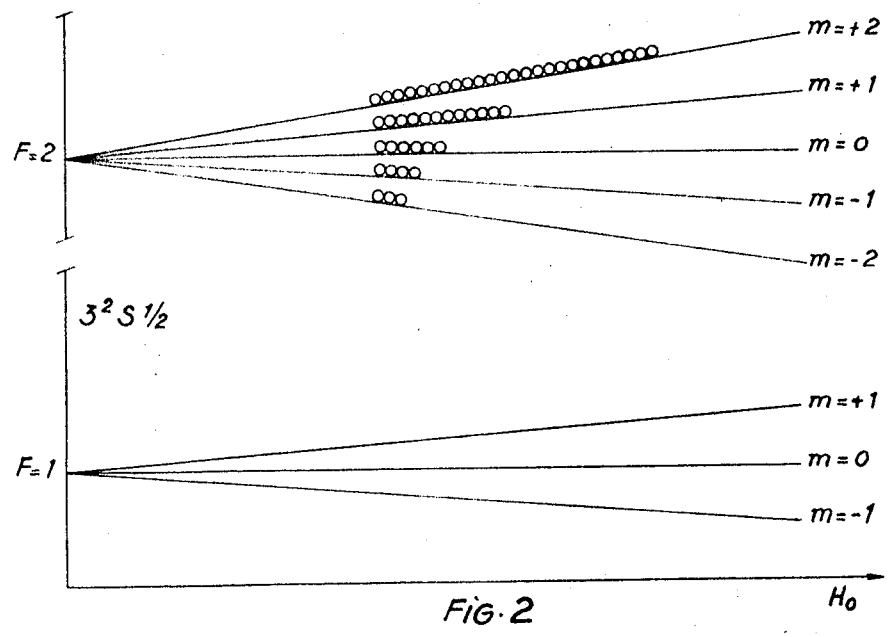
FIG. 2 is an explanatory diagram.

In FIG. 2, the distribution of the quantum levels in sodium, can be seen; the magnetic field strength $H_o$ has been plotted on the abscissae, in order to show the Zeeman splitting of the hyperfine levels $F = 1$ and $F = 2$ of the ground state $3^2Si/2$, and also of the levels of the excited state $3^2P1/2$. The level $F = 1$ of the ground state is splitted into three sub-levels the magnetic quantum numbers $m$ of which are equal to $-1, 0$ and $+1$. The level $F = 2$ is splitted into five sub-levels $m = 2, 1, 0, 1$ and $+1$. In the absence of any pumping light, it can be assumed that the sub-levels have substantially the same atomic population and this is due to Boltzmann's equipartition law.

If the alkali vapor is illuminated by the spectrum line $D_1$, circularly polarized in a direction $\sigma +$, then optical absorption transitions will selectively take place between the sub-levels of the ground state and those of the excited state; an atom at the sub-level $m = K$, for example, of the level $F = 2$ of ground state, is raised to a sub-level $m = k + 1$ of the excited state, and then it fall back to the sub-levels $k$, $k + 1$ and $k + 2$ of the ground state. This pumping process increases the population of the sub-levels $F = 2$, $m = +2$ at the expense of the lower sub-levels.

In FIG. 2, the populations of the sub-levels $F = 2$, $m = -2, -1, 0, 2,$ and $2$, once the optical pumping has been completed, have been sketched; in this state, the alkali vapor has a positive polarization $<S_3>$.

The same thing happens if the spectrum line $D_2$ of the pumping beam, with the same circular polarization of direction $\sigma+$, is used. It can be said, therefore, that the two spectrum lines $D_1$ and $D_2$ add their pumping effects, when they are polarized in the same direction.

However, as the pumping action due to the lines $D_1$ and $D_2$, is not the same for all the sub-levels, as far as the optical detection of the radio frequency transitions is concerned, it is observed that the application of the field $H_1$ has different effects according the whether the transparency of the vapor to the line $D_1$, or to the line $D_2$ is considered.

The following table indicates what are the probabilities of transition of a sodium atom occupying one of the sub-levels of the ground state.

| Sub-levels | | Line $D_1$ + | Line $D_2$ + |
|---|---|---|---|
| $F = 2$ | $m = +2$ | 0 | 6 |
| | $m = +1$ | 1 | 5 |
| | $m = 0$ | 2 | 4 |
| | $m = -1$ | 3 | 3 |
| | $m = -2$ | 4 | 2 |
| $F = 1$ | $m = +1$ | 3 | 3 |
| | $m = 0$ | 2 | 4 |
| | $m = -1$ | 1 | 5 |

Taking into account the positive polarization $<S_3>$ which the pumping light has produced in the alkali vapor, it will be seen that the sub-level $E = 2$, $M = +2$ has a higher atomic population than do the lower sub-levels. The result is that the line $D_1$, polarized in the direction $\sigma+$, is absorbed hardly at all, while the line $D_2$ is heavily absorbed; in other words, the most populous sub-level $F = 2$, $m = 2$ has a probability of absorption of the line $D_2$ which is substantially higher than its probability of absorption of the line $D_1$. When the alternating field $H_1$ acts on the vapor and if the frequency of this field is close to the center frequency $f_o$ of a radio frequency transition in the vapor, then the tendency will be towards equilibration of the populations of the sub-levels; the optical absorption of the spectrum line $D_2$ reduces and that on the line $D_1$ increases. Since these two mutually opposed effects are applied to the photoelectric transducer, the resultant is a negligibly small detected signal. This difficulty can be obviated by arranging in front of the photoelectric transducer 8 an interference filter 2 which eliminates one of the two radiation fractions transmitted by the absorption cell. However, this technique has the drawback that in practice it does not completely eliminate one of the two spectrum lines, since they are very close to each other.

The invention provides for the complete elimination of the undesired spectrum line, while wholly transmitting the other line. To this end, the interference filter is replaced by the polarizer elements shown in FIG. 3.

Figure 3:
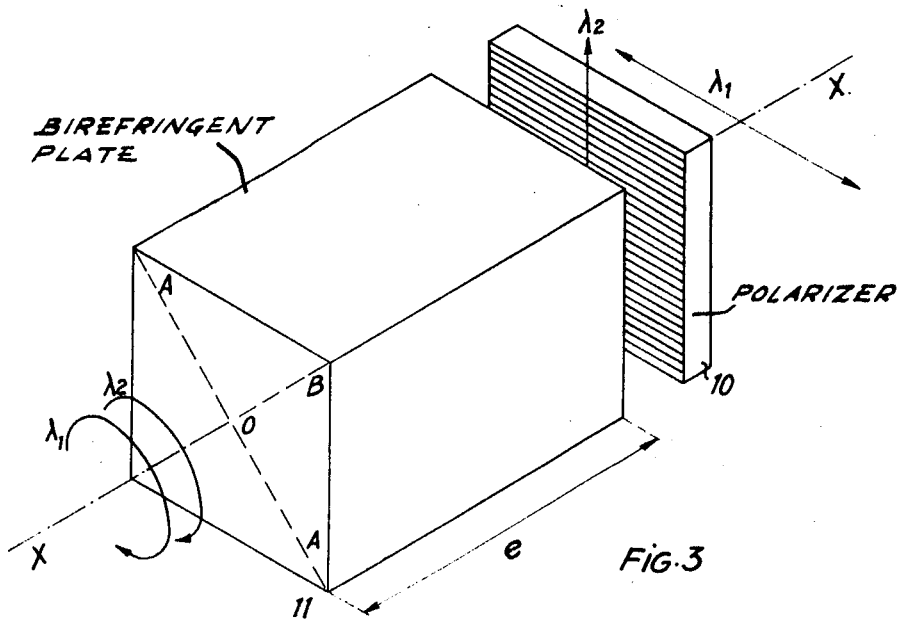
FIG. 3 illustrates a birefringent plate associated with a rectilinear polarizer.

The optical device shown in FIG. 3 is made up of a birefringent plate 11 and a rectilinear polarizer 10. The neutral lines OA and OB of the plate 11 are orientated at 45° to the direction of the polarizations produced by the polarizer 10; the entry face of the plate 11 receives the lines $D_1$ and $D_2$, circularly polarized in the direction $\sigma+$; the thickness $e$ of the plate is determined in such fashion that said radiation fractions leave it with rectilinear polarizations which are at right angles to one another.

In particular, the radiation $D_1$ whose wavelength is $\lambda_1$ leaves the plate 11 with a rectilinear polarization parallel to the direction of polarization of the polarizer 10; the radiation $D_2$ leaves the plate 11 in the form of a wave of wavelength $\lambda_2$ whose rectilinear polarization is perpendicular to the direction of polarization of the polarizer 10.

The thickness $e$ of the plate 11 is determined as follows:

The radiation $D_1$, on passing through the plate, experiences a differential phase shift $\Delta\phi_1$ while the radiation fraction $D_2$ experiences a differential phase shift $\Delta\phi_2$.

The differential phase shifts must satisfy the following relationships:

$$\Delta\phi_1 = 2k_1\pi - \pi/2 = 2\pi (e \Delta n)/\lambda_1$$
$$\Delta\phi_2 = 2k_2\pi + \pi/2 = 2\pi (e \Delta n)/\lambda_2$$

$\lambda_1$ being the wavelength in vacuum of the spectrum line $D_1$;
$\lambda_2$ being the wavelength in vacuum of the spectrum line $D_2$;
$k_1$ and $k_2$ being positive whole numbers;
$\Delta_n$ being the difference between the extraordinary index $n_e$ and the ordinary index $n$ of the birefringent material of which the plate is made. It will be assumed here that the entry and exit faces of the plate are parallel to the optical axis of the birefringent material.

These relationships lead to the following condition: $(K_1 - \frac{1}{4})\lambda_1 = (k_2 + \frac{1}{4})\lambda_2$.

Knowing $\lambda_1$ and $\lambda_2$, it is possible to select two whole numbers $k_1$ and $k_2$ which will duly satisfy the same condition. It is then an easy matter to calculate the thickness $e$ of the plate 11.

By way of example, a magnetometer operating with cesium vapor, utilizes for the optical pumping function, wavelengths of $\lambda_1 = 8,943$ A. and $\lambda_2 = 8,521$ A.

By cutting the plate 11 from a quartz block whose indices $n_o$ and $n_e$ differ by $\Delta_n = 0.0085$, it will be seen that the numbers $k_1 = 30$ and $k_2 = 31$ will satisfy the above described condition. Accordingly, the thickness of the plate 11, deduced from the formulas set out thereinbefore, has a value $e = 3,008$ $\mu$. The foregoing calculations show that by suitably selecting the wavelengths $\lambda_1$ and $\lambda_2$, it is possible to define a plate thickness which will make it possible to convert the radiations $D_1$ and $D_2$ into radiations which are rectilinearly polarized in accordance with two mutually perpendicular directions. In practice, it is not necessary for the radiation fractions emerging from the double-refracting plate to have precisely rectilinear polarizations; this mans that the determination of the numbers $k_1$ and $k_2$ is made simpler by stating the condition $k = k_1 = k_2$. One then has:

$$k = \frac{\frac{1}{4}(\lambda_2 + \lambda_1)}{\lambda_1 - \lambda_2}$$

Using this latter formula, in the case of cesium one finds:

$$\frac{\frac{1}{4}(\lambda_2 + \lambda_1)}{\lambda_1 - \lambda_2} = 10.3$$

By adopting the whole number $k = 10$, it will be seen that the thickness of the plate 11 can be made equal to $e = 986$ $\mu$.

Figure 4:
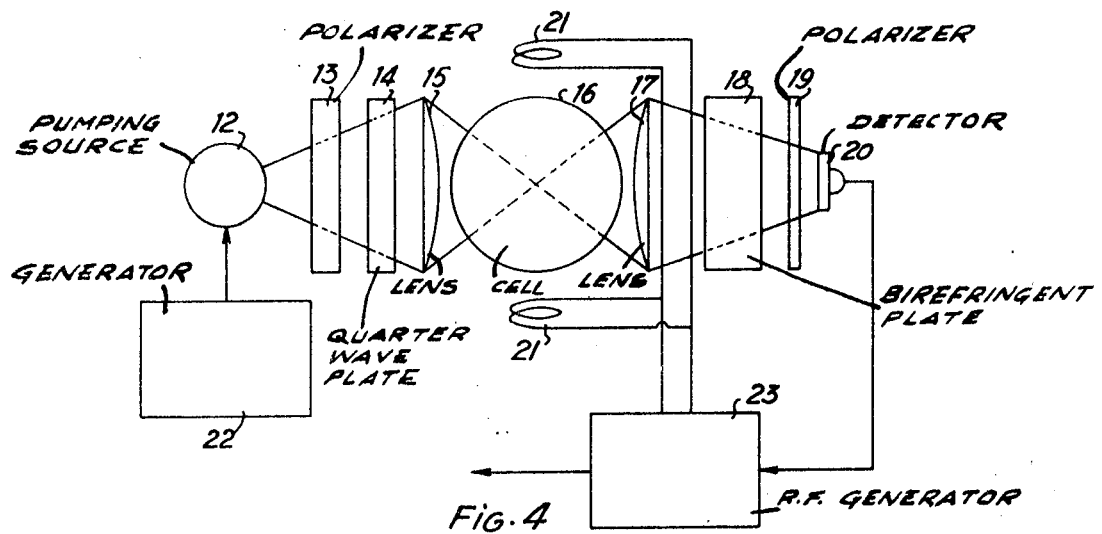
FIG. 4 schematically illustrates an optically pumped magnetometer in accordance with the invention.

In FIG. 4, the diagram of an optical pumping magnetometer in accordance with the invention can be seen.

It comprises an absorption cell 16 containing alkali vapor, a light source 12 supplied by a generator 22 and emitting two optical spectrum lines $D_1$ and $D_2$ capable of optically pumping the vapor contained in the cell 16, and a photoelectric detector 20 which picks up the light transmitted through the cell 16. Between the source 12 and the cell 16, there is placed a rectilinear polarizer 13, a birefringent plate of the quarter wave type, 14, and a lens 15; between the cell 16 and the detector 20, there is a lens 17, a birefringent plate 18 and a rectilinear polarizer 19. The cell 16 is subjected to the effect of an alternating field $H_1$ created by the inductors 21; the inductors 21 pass a current of frequency $f$ supplied by the circuit 23, the latter having a control input connected to the detector 20.

This circuit 23 is designed so that the frequency $f$ coincides with the frequency $f_o$, the latter characterizing one of the radio frequency transitions in the vapor. The plate 18 receives two radiation fractions $D_1$ and $D_2$ circularly polarized in the same direction, and converts them into radiation fractions which have mutually perpendicular rectilinear polarizations. The direction of polarization of the polarizer 19 is aligned parallel to the bisector of the neutral lines of axes of the plate 18, so that only one of the two spectrum lines transmitted by the alkali vapor is actually transmitted right through to the detector 20.

Of course, the invention is not limited to the embodiment described and shown which has been given solely by way of example.

What is claimed is:

1. An optical pumping magnetometer comprising an absorption cell filled with an alkali vapor, a light source for emitting toward said cell a beam of light containing two lines $D_1$ and $D_2$ of the emission spectrum of said vapor, means positioned between said source and said cell for circularly polarizing in the same direction the luminous energies respectively corresponding to said lines $D_1$ and $D_2$, a photoelectric transducer positioned for receiving the light emerging from said cell, further polarizing means positioned on the path of said emerging light for selectively transmitting one of said lines $D_1$ and $D_2$ toward said transducer, means for applying to said cell a RF magnetic field, and readout means; said cell having walls internally lined with a layer preserving the alignment of the alkali atoms.

2. An optical pumping magnetometer as claimed in claim 1, wherein said further polarizing means comprise: a birefringent plate having an input face for receiving the circularly polarized energy emerging from said cell and corresponding to said lines $D_1$ and $D_2$, an output face parallel to said input face, and two neutral axes lying in a plane parallel to said faces; a rectilinear polarizer positioned beyond said output face, said rectilinear polarizer having a polarization direction at an angle of 45° with respect to said axes; the distance of said faces being adjusted for converting the circularly polarized luminous energies of lines $D_1$ and $D_2$ received by said input face into rectilinearly polarized energies of perpendicular polarization directions.

3. An optical pumping magnetometer as claimed in claim 2, wherein said plate is cut in a birefringent material having an ordinary and an extraordinary index of refraction differing from each other by the quantity $\Delta_n$; said lines $D_1$ and $D_2$ having respective wavelengths $\lambda_1$ and $\lambda_2$; said distance being substantially equal to both $(k_1 - \frac{1}{4})\lambda_1$ and $$\frac{\left(k_2 + \frac{1}{4}\right)\lambda_2}{\Delta_n}$$

, $k_1$ and $k_2$ being two positive whole numbers.

4. An optical pumping magnetometer as claimed in claim 3, wherein said numbers $k_1$ and $k_2$ are equal.

5. An optical pumping magnetometer as claimed in claim 3, wherein said alkali vapor is cesium and said birefringent material is quartz.

* * * * *